Figure 1:
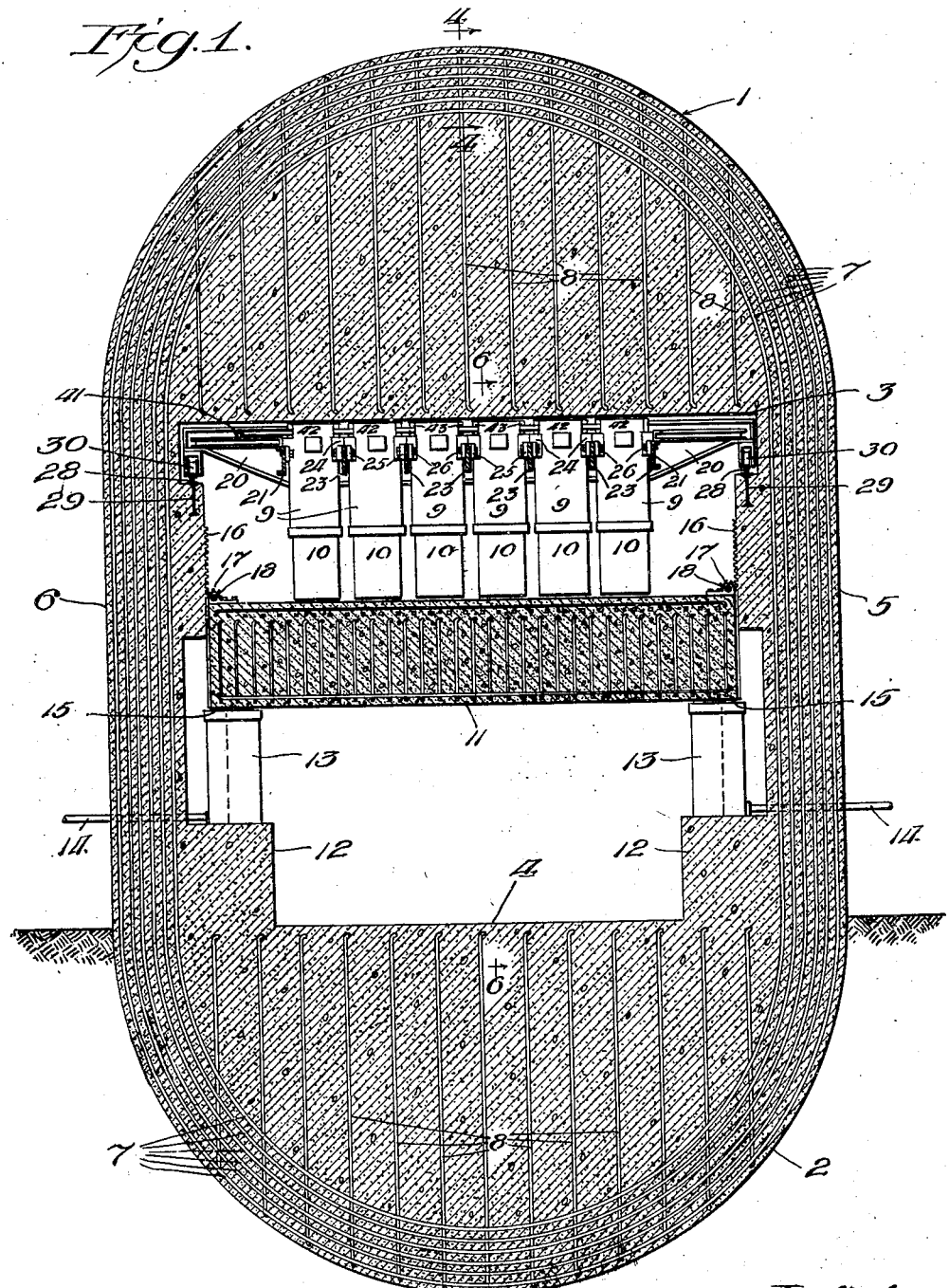

May 2, 1933.  G. R. MEYERCORD ET AL  1,907,083

POWER PRESS

Filed April 16, 1932    9 Sheets-Sheet 1

Inventor:
G. R. Meyercord, O. R. Bacquin & C. B. Norris
by Wm. F. Freudenreich, Atty.

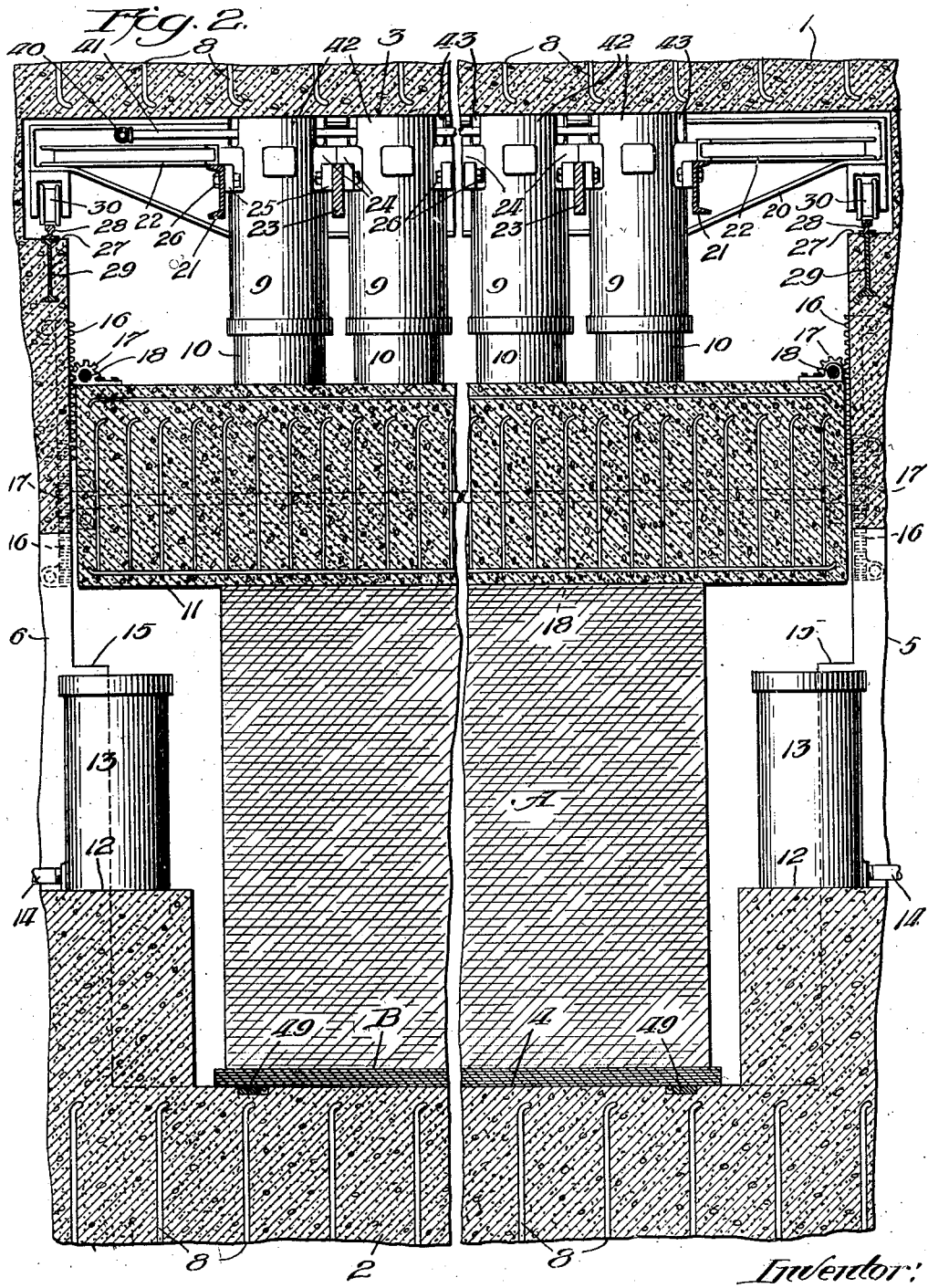

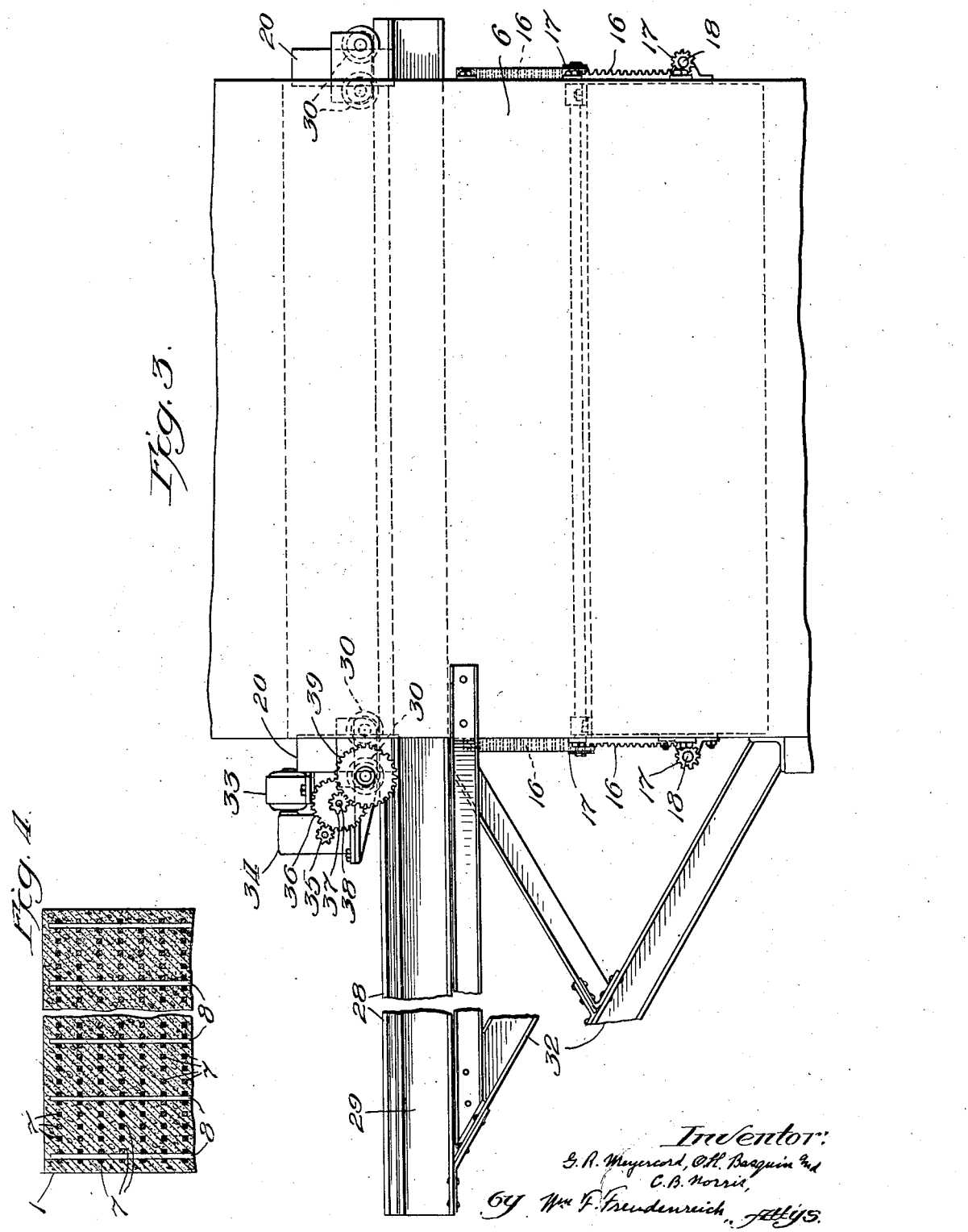

May 2, 1933.　　　G. R. MEYERCORD ET AL　　　1,907,083
POWER PRESS
Filed April 16, 1932　　　9 Sheets-Sheet 4
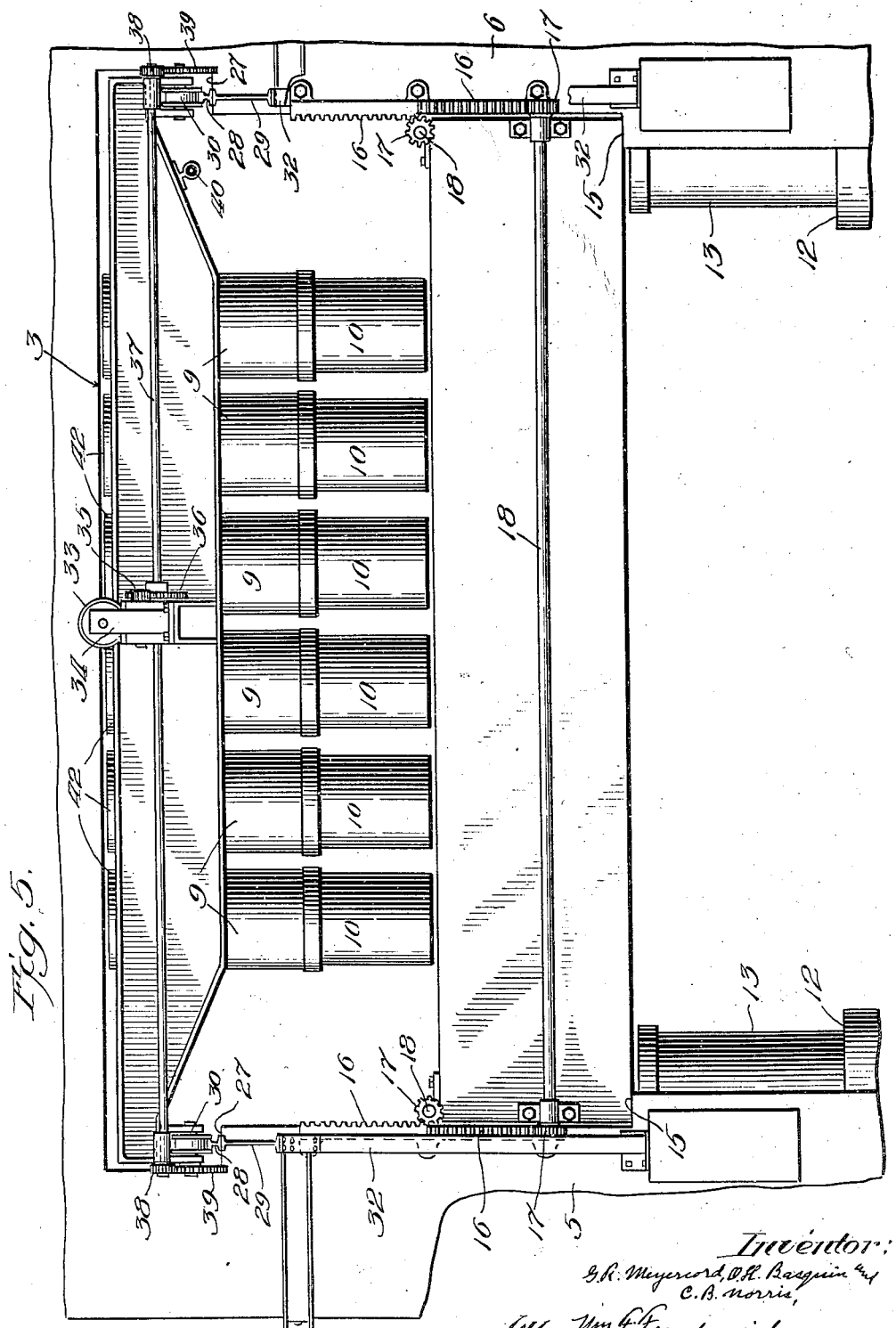

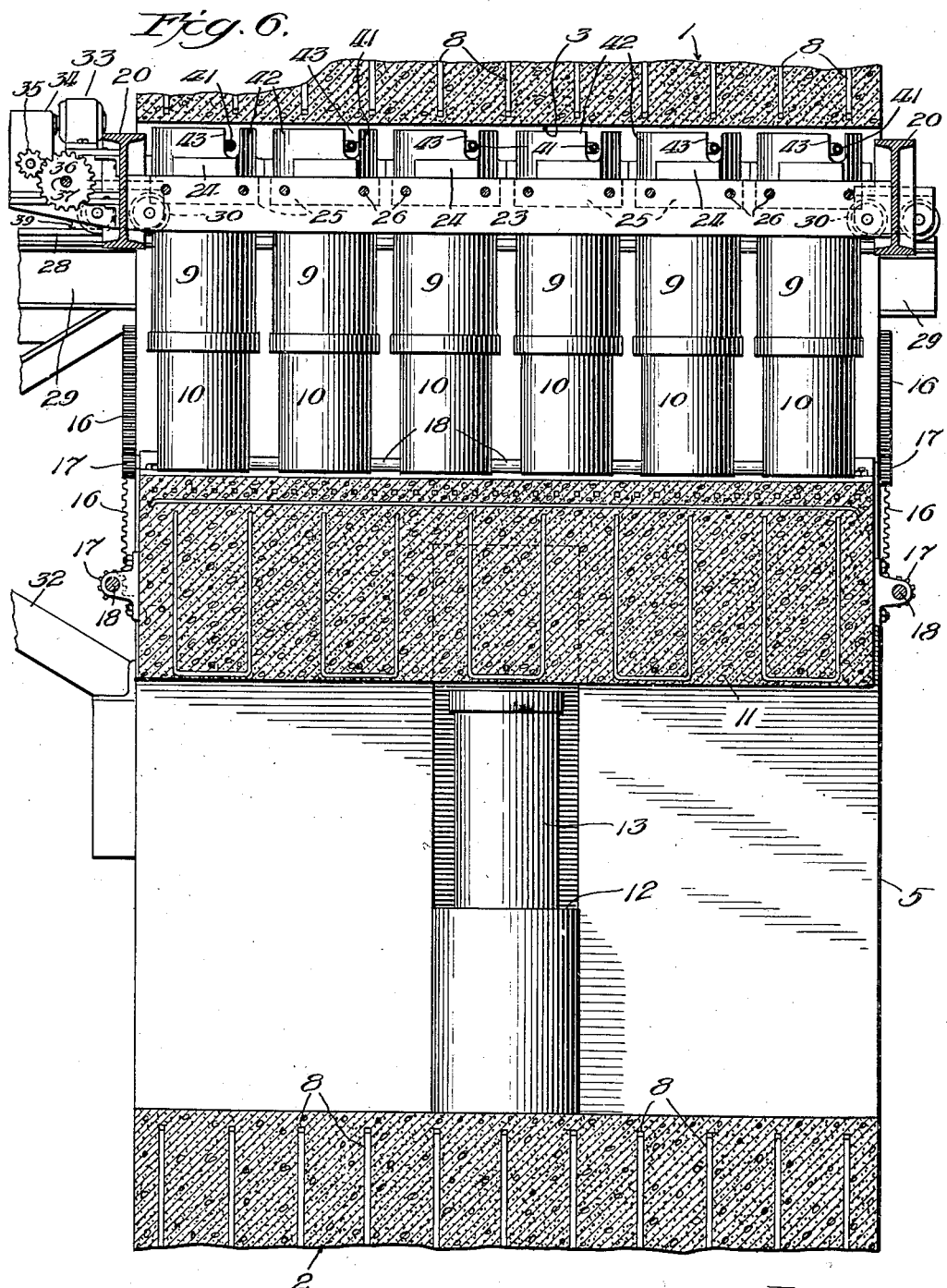

May 2, 1933.  G. R. MEYERCORD ET AL  1,907,083
POWER PRESS
Filed April 16, 1932  9 Sheets-Sheet 6
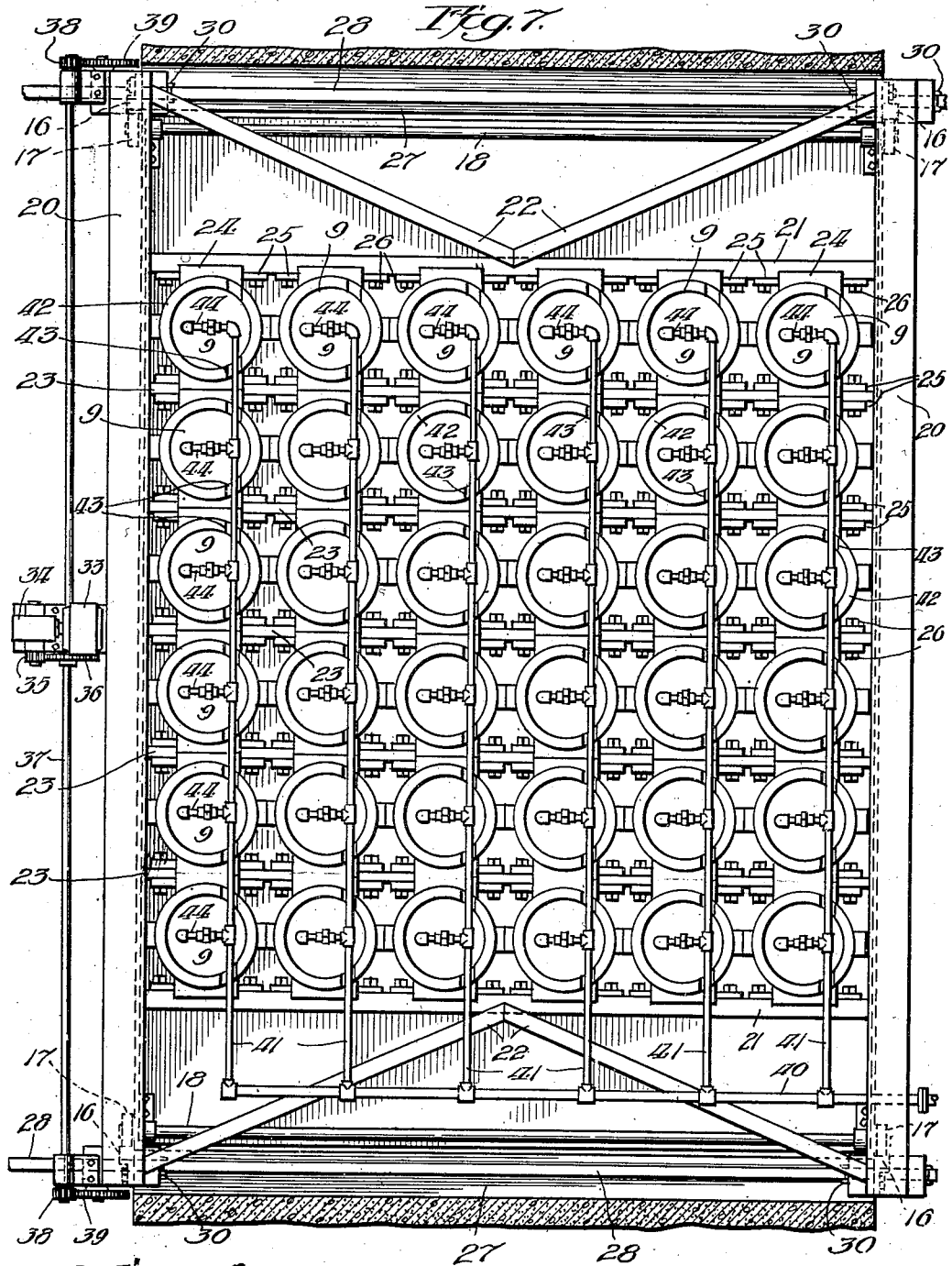

May 2, 1933.   G. R. MEYERCORD ET AL   1,907,083
POWER PRESS
Filed April 16, 1932   9 Sheets-Sheet 7
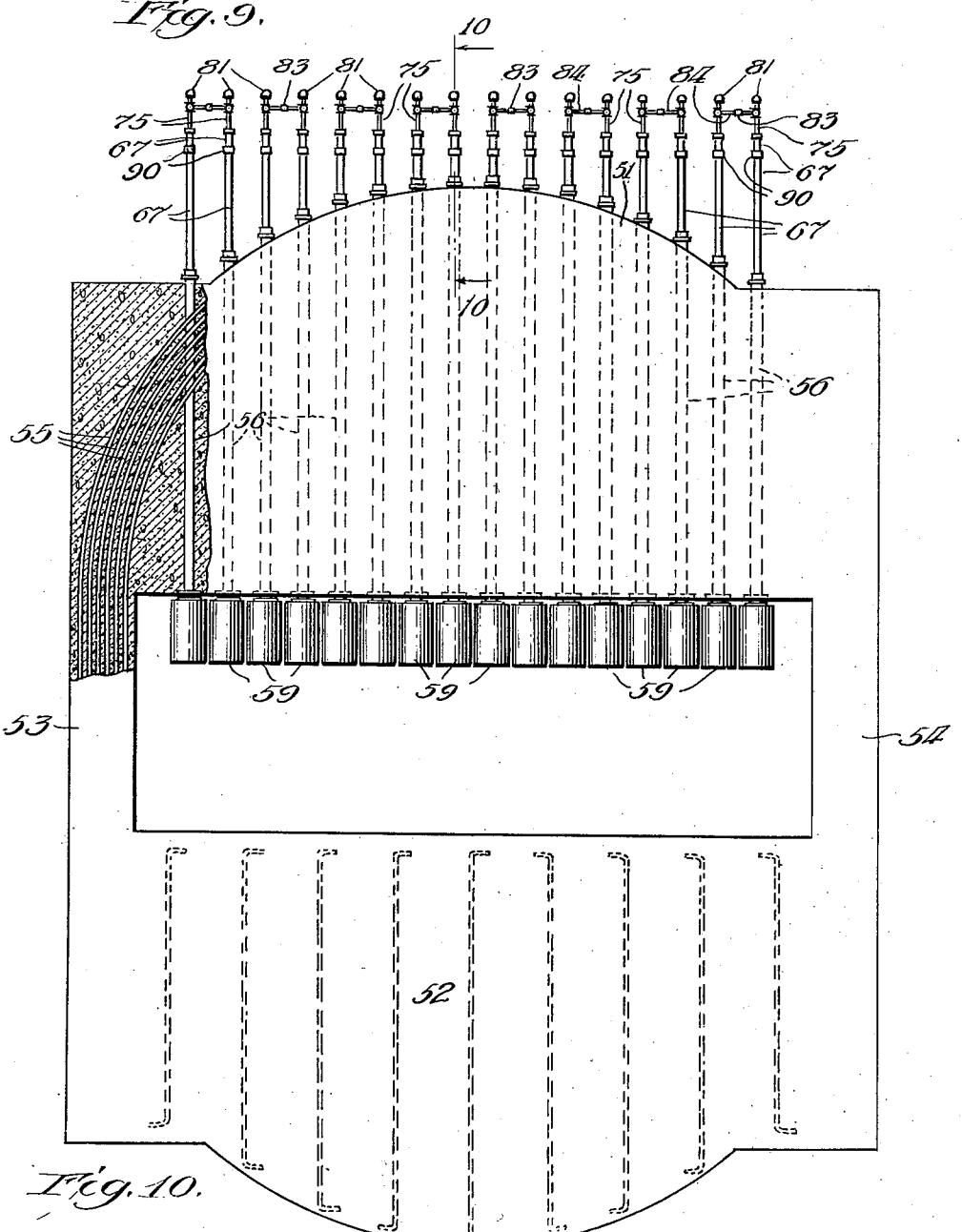
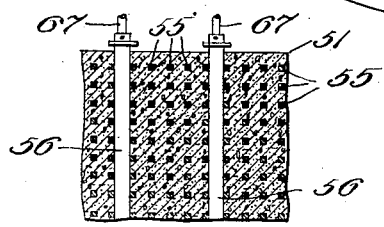

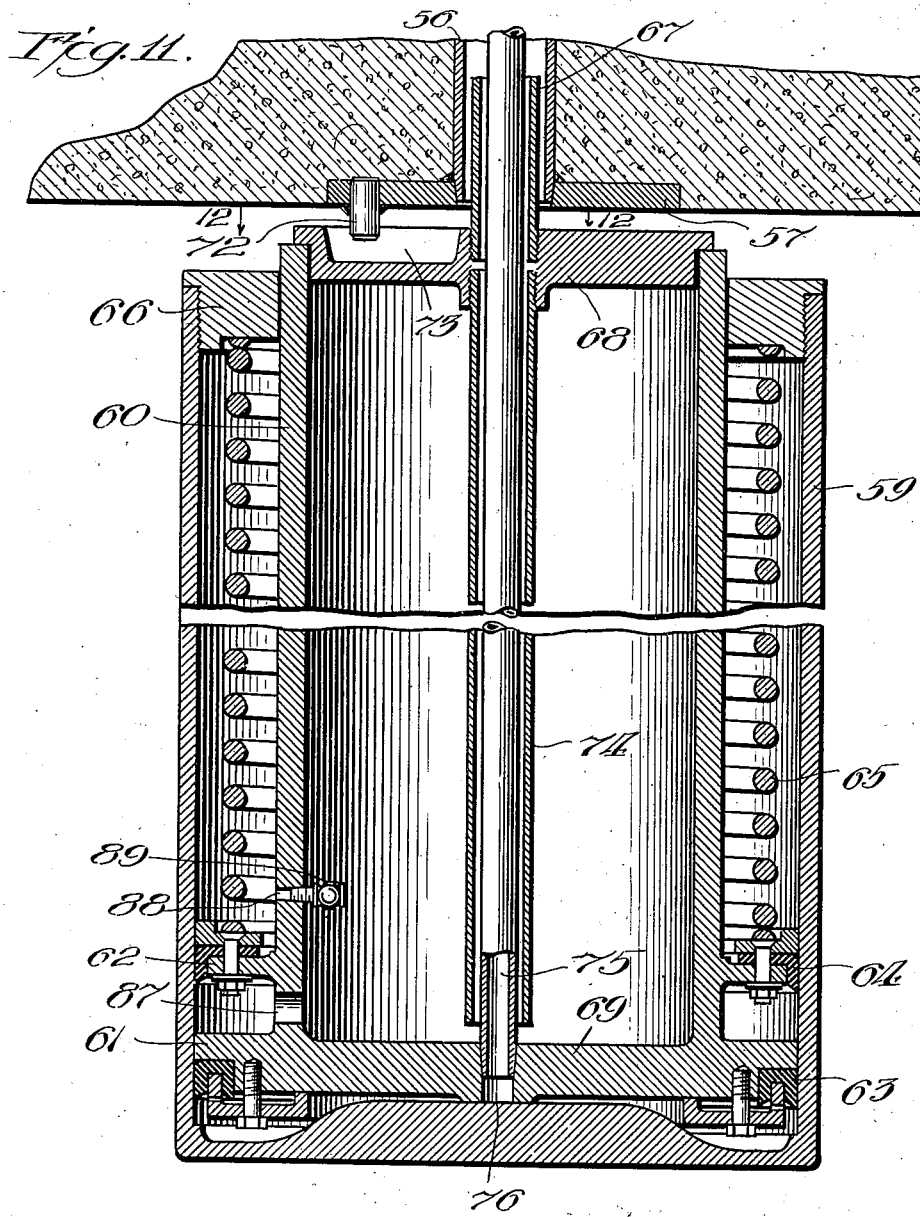
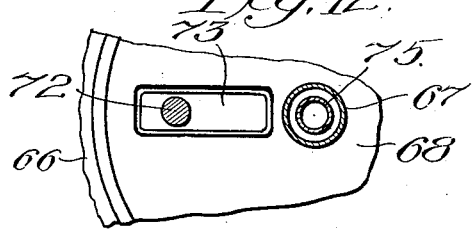

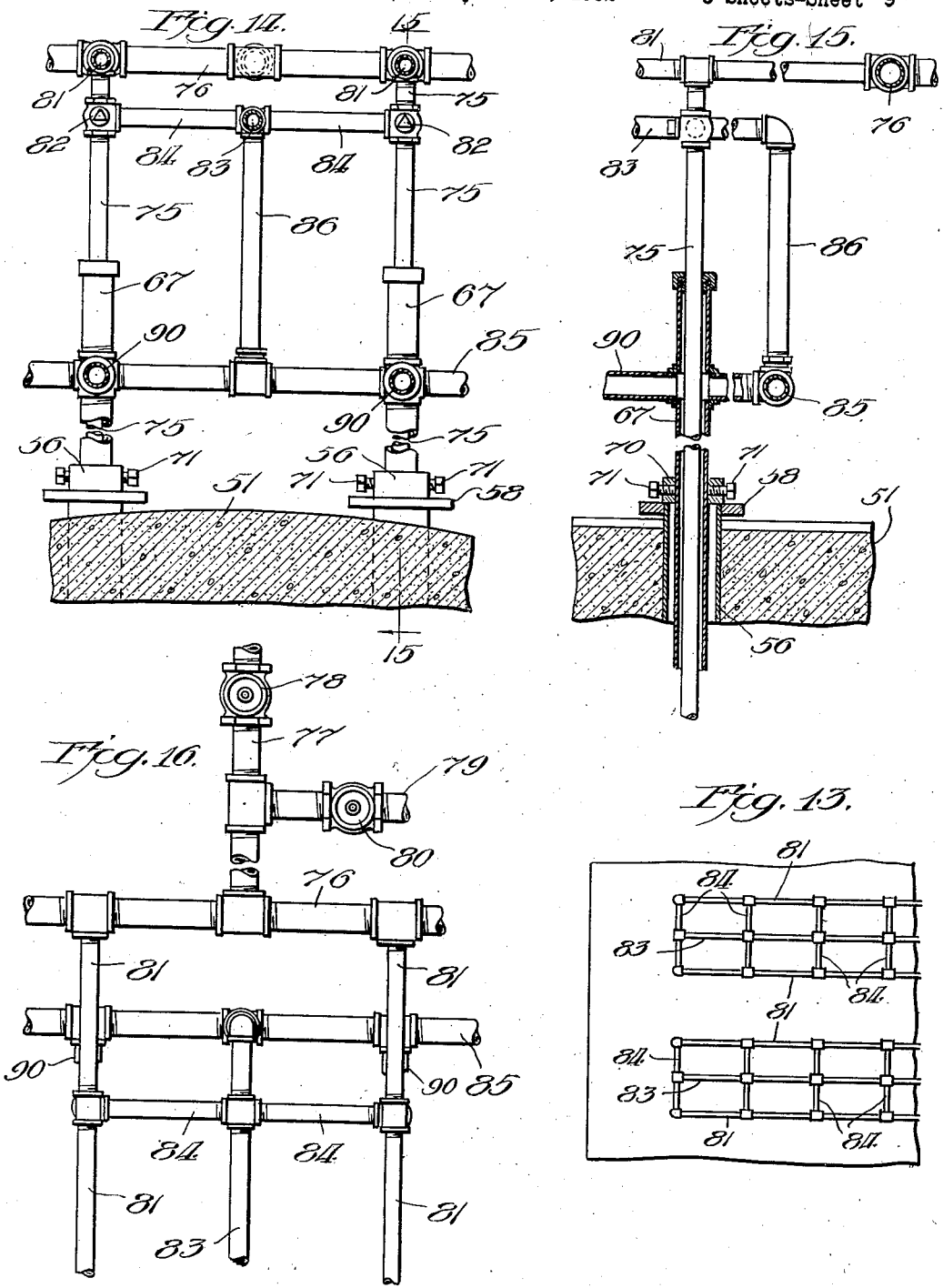

Patented May 2, 1933

1,907,083

UNITED STATES PATENT OFFICE

GEORGE R. MEYERCORD, OF CHICAGO, OLIN H. BASQUIN, OF EVANSTON, ILLINOIS, AND CHARLES B. NORRIS, OF GRAND RAPIDS, MICHIGAN, ASSIGNORS TO HASKELITE MANUFACTURING CORPORATION, A CORPORATION OF NEW YORK

POWER PRESS

Application filed April 16, 1932. Serial No. 605,770.

The object of the present invention is to produce a press of great power which, because of a simple and novel construction, will cost much less than presses constructed in accordance with old practice. Therefore, viewed in one of its aspects, the present invention may be said to have for its object to produce a power press of novel and unique construction.

In carrying out our invention, we form the frame of the press of reenforced concrete in the form of a monolith having a work-receiving opening bounded at the top and bottom by flat, parallel pressure-receiving surfaces of large area. The concrete is reenforced with numerous bars completely surrounding the work-receiving opening and so designed that the stresses in the concrete above the upper pressure-receiving surface and below the lower pressure-receiving surface are mainly compression stresses while the bars are under tension. Specifically considered, each reenforcing bar may be regarded as consisting of two vertical side sections, one at each side of the work-receiving opening, and curved upper and lower cross sections. One ideal form of press is that containing continuous reenforcing bars whose upper and lower cross members are bent into semi-circles having their centers in the plane of the corresponding pressure-receiving surface. In this ideal form, the thrusts on the pressure-receiving faces being at right angles thereto, namely, parallel with the direction of the length of the vertical legs or sections of the reenforcing bars, the semi-cylindrical masses of concrete at the top and at the bottom transmit the thrusts thereon along radii of the circles into which the bars are bent; the effect being substantially the same as though the semi-cylindrical portions of the bars at the top and bottom of the press formed a tube containing fluid under great pressure.

The reenforcing bars that form loops surrounding the work-receiving opening may be and usually are made in sections joined together by welding or in any other manner commonly employed in the case of tension rods or bars in concrete construction, so that each loop may be referred to as continuous.

The work to be placed under pressure is set on the lower pressure-receiving face and is placed under compression by means of numerous rams disposed between the top thereof and the upper pressure-receiving face; these rams being distributed across the length and breadth of the face with which they cooperate, so that the pressure will be distributed over a large area both on the work and on the stationary frame of the press. The rams may act directly on the work or on a suitable caul overlying the work, or a suitable platen, forming part of the machine, may be interposed between the rams and the work. Where a platen is employed it may be made of reenforced concrete, being simply a large, thick panel or slab of such material. This is made possible by reason of the fact that the stresses to which the platen is subjected are simply compression stresses. In other words, if there were only one powerful ram in the center of a long, wide platen, the platen would be subjected to bending stresses in the manner of a beam; but, because the rams are distributed over the length and breadth of the platen, there will be no substantial bending stresses in the platen or, at most, such stresses will be due to the comparatively small pressure of a single ram at any given point and will therefore be of no consequence.

The rams may be permanently mounted in the press or they may be mounted so as to be readily movable into and out of position for inspection or repair. For example, all of the arms may be mounted on a rugged carriage which may be rolled along rails into a position directly underneath the upper pressure-receiving surface of the press or be run out so as to bring all of the rams outside of the press.

The rams are preferably hydraulic rams of any suitable or usual construction, and they may be controlled so as to operate in unison, individually, or in selected groups, as may be desired.

Our improved press, because of the cooperation of steel rods which are under tension and concrete which is required only to resist compressive forces, is much more compact than one built wholly of steel and iron according to old practices. Therefore, viewed in one of its aspects, the present invention may be said to have for its object to produce a powerful press of simple and rugged construction which, at the same time, occupies a minimum amount of space.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 shows one of our improved presses in vertical section, the press containing a movable platen which is shown in a lowered position of rest; Fig. 2 is a view, on a larger scale, similar to Fig. 1, showing only a fragment of the press, and the press being shown as containing a stack of panels on which the platen, in an elevated position, is resting; Fig. 3 is a side elevation of a fragment of the press; Fig. 4 is a section, on a larger scale than Fig. 1, on line 4—4 of Fig. 1; Fig. 5 is a front elevation of the press, on the same scale as Figs. 2 and 3, showing only a fragment thereof, and the parts being in the positions shown in Fig. 1; Fig. 6 is a section on line 6—6 of Fig. 1, the scale being the same as that of Figs. 4 and 5; Fig. 7 is a top plan view of the battery of rams and the carriage therefor, adjacent fragments of those portions of the press frame that support the carriage being shown in section; Fig. 8 is a detail showing the valves for admitting pressure to the rams in Fig. 7 and again releasing the pressure; Fig. 9 is a view, partly in front elevation and partly in section, showing a modified form of press; Fig. 10 is a section on line 10—10 of Fig. 9; Fig. 11 is a vertical section, on an enlarged scale, through one of the rams in Fig. 9 and a fragment of the overlying mass of concrete; Fig. 12 is a section on line 12—12 of Fig. 11, only a fragment of the ram being shown; Fig. 13 is a piping diagram showing a portion of the piping system for the rams in the modified form of press; Fig. 14 is a vertical section through the extreme top of the press on a plane parallel with the front face of the press, showing the piping to two adjacent rows of rams; Fig. 15 is a section on line 15—15 of Fig. 14; and Fig. 16 is a top plan view of the piping shown in Figs. 14 and 15.

Referring to Figures 1–8 of the drawings, 1 and 2 are two semi-cylindrical blocks of concrete lying one above the other with their flat faces 3 and 4 parallel with each other. Between the members 1 and 2 are concrete upright sections or legs 5 and 6, one at each side so as to form with the members 1 and 2 a frame having a large central opening bounded at the top and bottom by flat parallel faces which, as will hereinafter be explained, are the pressure-receiving faces of the press. The members 1, 2, 5 and 6 are cast as a single unit so as to constitute a monolith. Embedded in the concrete, surrounding the opening therein, which is the work-receiving opening, and lying near the top and bottom and side faces of the monolith, are endless reenforcing bars 7 each consisting of two semi-circular end sections and two upright side sections; the end sections being embedded in the members 1 and 2, respectively, and the upright sections being embedded in the members 5 and 6 of the concrete mass or body. There are a plurality of layers of these endless reenforcing bars, the corresponding semi-circular end sections in the several layers being concentric, but differing in diameter, whereas the upright or leg sections are all parallel. In the arrangement shown, there are six layers of these endless reenforcing bars and, as will be evident from Fig. 4, there are a great many bars in each layer. Each of the members 1 and 2 contains numerous additional reenforcing bars which may be simple straight bars 8 positioned at right angles to the planes of the pressure-receiving faces 3 and 4; these bars being preferably welded to the semi-circular portions of the endless bars.

It will be seen that, if rams or other power means are interposed between the two pressure-receiving faces and are operated in a manner tending to force the members 1 and 2 apart, through forces distributed over the length and breadth of each of the pressure-receiving faces, the concrete in the members 1 and 2 will be under compression, whereas the loop-like reenforcing bars will be under tension. By placing enough steel in these endless tension members, they will be able to resist enormous forces tending to spread the pressure receiving faces of the press apart.

The power for applying pressure to the work in the press is provided by a large number of jacks or ram devices. In the arrangement shown, there are thirty-six hydraulic rams arranged in the form of a square composed of six rows each containing six rams. The rams comprise cylinders 9 through the open lower ends of which move plungers 10. The upper ends of the rams are adapted to abut against the pressure-receiving face 3 while exerting pressure on work in the press in a direction tending to force the work against the lower pressure-receiving face 4. In the particular form of press here illustrated, the rams do not engage the work directly but act on a vertically movable platen 11 which may be simply a thick flat slab of reenforced concrete. If the platen were subjected to any considerable bending stresses, it could not be made of concrete but, since the pressure is applied to the upper surface of the platen at a large number of distributed points where the rams contact with the platen, the principal stresses in the platen are compression stresses. Furthermore, while the total pressure of the rams is great, that of any particular ram is comparatively small, so that the bending stresses that might result from the pressure of a single ram are not important. The platen must be raised to permit the work to be introduced in the press while leaving the platen free to move down and apply pressure to the work. In the arrangement shown, we have provided each of the upright portions 5 and 6 of the frame with an inwardly-projecting step portion 12 at its juncture with the lower semi-cylindrical member 2. On these steps are located hydraulic lifting rams 13, 13 which underlie the platen at opposite sides of the press and about midway between the front and rear ends thereof. Pressure may be built up in these rams or be released in any suitable way as, for example, through the pipes 14. Above each of the steps 12 is formed in the concrete a second, narrower step 15, the horizontal face of which preferably lies somewhat above the tops of the rams 13, 13 when these rams are deenergized; so that normally, when the press is not in use, the platen will be supported on the steps 15, 15 and not on the lifting rams. Mounted in part on the frame members 5 and 6 and in part on the platen are suitable rack and pinion devices in which the racks are indicated at 16 and the pinions at 17, to compel the platen to remain perfectly horizontal as it moves up and down. The pinions are arranged in pairs, those of each pair being connected by a shaft 18. As the platen moves up or down, the pinions roll along the racks, but no pinion can move faster than its companion to which it is secured by the intervening shaft. By placing the pinions of each pair apart a distance equal to the entire length or width of the platen as the case may be, there can obviously be no tilting of the platen. Thus, the shaft 18, which is shown in Fig. 7 as extending entirely across the width of the platen, together with the pinions on this shaft and the cooperating stationary racks, will prevent either the left-hand or the right-hand end of the platen, as viewed in Fig. 2, from moving up or down faster than the other end.

The pressure rams may conveniently be mounted on a low truck or carriage which will permit them to be moved from their working positions in the press to idle positions on the outside of the press; thus making them readily accessible for inspection and repair. The carriage or truck illustrated is composed of heavy front and rear cross beams 20, 20 connected together by beams 21, 21 lying toward but at some distance from the ends of the cross beams. Suitable braces 22, 22 may extend diagonally from the middle of each of the side beams 21 to the corresponding ends of the front and rear cross beams. The space between the beams 20 and 21 is divided into six equal compartments by flat beams 23 set on edge at equal distances apart. Each compartment, thus formed, contains six of the pressure rams. As best shown in Figs. 2, 6, and 7, the diameters of the ram cylinders is somewhat less than the width of each of the compartments or spaces in the carriage frame. Each cylinder has on opposite sides projecting lugs 24, 24 which rest upon the upper edges of the beams between which they lie. Thus, the lugs on each of the endmost cylinders, as viewed from the front of the press, rest on a side beam and on a beam 23, respectively, whereas the lugs on the other four cylinders rest on the corresponding beams 23. Each cylinder is also provided with additional lugs 25 resting against the sides of the two beams between which it lies. These latter lugs or ears are secured to the beams by means of bolts 26. The carriage frame and the cylinders of the pressure rams are, therefore, secured together into a rigid whole.

Each of the side members 5 and 6 of the reenforced concrete frame has, in addition to the steps 12 and 15 heretofore described, a third step 27 which is only a short distance below the upper pressure-receiving face 3. On the steps 27 are rails 28 extending from front to rear. These rails may conveniently be set upon I-beams 29 embedded in the concrete. The ram-supporting carriage has thereon flanged wheels 30 that run on the rails. The I-beams 29, as best shown in Fig. 3, project far out in front of the press proper, the projecting ends being held up by suitable diagonal braces 32; and the rails are continued out along the projecting portions of the I-beams. The I-beams and the rails project far enough from the press to permit the entire carriage to be rolled out from underneath the top member of the press frame; thus giving ready access to the pressure rams and permitting them to be conveniently inspected and repaired. The carriage is preferably motor driven. For this purpose, there is mounted on the front end of the carriage an electric motor 33 which, through a suitable speed-reducing mechanism 34 and a train of gearing, drives two of the wheels 30, one on each side of the carriage. As will be seen from Fig. 7, the power-delivering element of the speed-reducing gear is a pinion 35 that meshes with a large gear wheel 36 on a transverse shaft 37. At its opposite ends this shaft has pinions 38 meshing with large gear wheels 39, each fixed to one of the carriage-supporting wheels 30.

Fluid under pressure is supplied to the upper ends of the cylinders of the pressure rams through a main supply pipe 40 from which extend branch pipes 41, one for each transverse row of cylinders. At the top the cylinders have upwardly-projecting annular flanges or rims 42 through which contact is made between the rams and the overlying pressure-receiving surface. Notches 43 are cut into these flanges to receive the pipes 41 and permit them to extend across the top of the carriage. Each cylinder has a pipe 44 connecting it with the corresponding branch pipe. Fluid under pressure may be delivered to the pipe 40 from any suitable source, as through a pipe 45, as indicated in Fig. 8; there being a manual valve 46 between the pipe 45 and the pipe 40. When it is desired to relieve the pressure in the ram cylinders, this may be done by closing the valve 46 and opening a valve 47 in another pipe 48 connected to the pipe 40. The pipe 48 permits the water to be drained out of the pressure cylinders when the platen is raised by means of its lifting rams and thus forces the plungers of the pressure rams up.

The operation of the rams will probably have been understood from the foregoing description. Briefly stated, however, it may be said that Fig. 1 illustrates the press in its normal idle position; the rams 13 being down, the platen 11 resting on the steps 15, and the pressure rams being deenergized. When work is to be placed in the press, the lifting rams 13 are energized, raising the platen. The work is then placed in the press, being supported by the lower pressure-receiving face 4 and, upon deenergization of the rams 13, the platen is lowered down upon the work. This is the condition illustrated in Fig. 2 in which the work is represented as consisting of a stack A of multiple-ply panels that has been moved into place while supported on a rolling platform or low truck B provided with disappearing wheels, not shown, adapted to run on rails 49 set in the flat face of the member 2. Fluid under pressure is then admitted to the cylinders 9 of the pressure rams. The first result of the pressure in these cylinders is to lift the cylinders and their supporting carriage bodily until the annular flanges on the upper ends of the cylinders are in intimate contact with the upper pressure-receiving face 3. After the work has been subjected to the proper degree of pressure, for the proper length of time, the pressure cylinders are connected to drain pipe so that, when the platen is raised by means of the lifting rams, the plungers 10 of the pressure rams will be pushed up, forcing the water out of the cylinders. The flat lower pressure-receiving face may be made long and wide so that great stacks of very large panels, for example, can be compressed by a single operation.

In Figures 9–16, there is illustrated a modification which permits the pressure rams to act directly on the work and, further, permits all, or only a portion, of the rams to be employed at a time.

The monolithic frame comprises semi-cylindrical upper and lower blocks or sections 51 and 52 connected by upright side pieces 53 and 54. Continuous reenforcing bars, similar to those heretofore described, extend through the upright sections and through the semi-cylindrical blocks, as before. It will be noted that the semi-cylindrical blocks have additions produced by continuing the outer side faces of the vertical sections 53 and 54 upwardly and downwardly. However, those portions of the sections 51 and 52 lying outside of the imaginary cylinder do not affect the principle of causing the endless reenforcing rods or bars to be placed under tension while the semi-cylindrical masses of concrete enclosed thereby are under compression. In this construction the vertical reenforcing elements in the upper block or section 51 are in the form of pipes or tubes 56 extending entirely through the concrete and preferably welded to the endless reenforcing bars 55. On the lower end of each of these reenforcing tubes is welded a disk 57 that lies flush with the under face of the block or section 51. Each of the reenforcing tubes preferably projects somewhat above the top of the concrete and is there provided with a collar or flange 58 welded thereto. Below and coaxial with each of the reenforcing tubes is a ram comprising a cylinder 59 open at the top and closed at the bottom and containing a plunger 60 adapted to pass in and out through the upper open end of the cylinder. The body portion of the plunger is smaller in diameter than the interior of the cylinder so as to permit of the presence of annular flanges 61 and 62 on the lower end of the plunger and extending across the space between the body portion of the plunger and the surrounding cylinder wall. Suitable packings 63 and 64 are carried by these annular flanges. A strong helical compression spring 65 surrounds the body portion of the plunger, resting at its lower end on the flange 62 and abutting at its upper end against a ring 66 screwed into the upper open end of the cylinder. This spring is strong enough to push the cylinder up when the hydraulic pressure is released.

Each ram is supported by a pipe 67 extending loosely through the corresponding reenforcing tube and screwed at its lower end into the head 68 of the body portion of the plunger; the plunger being preferably in the form of a deep cylindrical cup having an integral bottom wall 69 and a top wall or head 68 welded in place. Each of the pipes 67 extends up beyond the top of the surrounding reenforcing tube and has thereon a collar 70 resting on the upper end of that reenforcing tube. These collars may be held in place by means of set screws 71 which will permit the collars to be adjusted and also to be removed so as to permit the pipes to be raised and lowered. The plate 57 has thereon a downwardly-projecting pin 72 that enters a depression 73 in the upper side of the head 68 to hold the plunger of the ram from turning. Coaxial with the pipe 67, but screwed into the head 68 from below, is a piece of pipe 74 that extends almost to the bottom wall 69 of the hollow plunger. Fluid under pressure may be delivered into the cylinder below the plunger through a pipe 75 that is screwed at its lower end into a hole 76 passing entirely through the wall or head 69. The pipe 75 extends up through and beyond the top of the pipe 67. It will be seen that if the pipe 75 is connected to a pipe or conduit adapted to deliver fluid under pressure, this fluid will flow into the lower end of the cylinder under the flange 61 and cause the cylinder to be forced down against the resistance of the spring 65. When the pipe 75 is connected to a drain, the spring will force the cylinder up and push the fluid back through the pipe 75.

There are a great many rams extending across the length and breadth of the press and the energization and deenergization of the same may be controlled in various ways. Sometimes it may be desirable to bring into play all of the rams whereas, at other times, only a part of the rams will be needed. We have, therefore, coupled up the rams and provided the necessary valves to permit the operation of the rams as a unit or a selective operation of any desired number thereof. The operating fluid for the rams passes through a header 76, flowing in one direction to energize the rams and in the opposite direction upon deenergization. The fluid under pressure may be delivered to the header through a pipe 77 containing a hand valve 78 and may afterwards escape from the header through a drain pipe 79 connected to the pipe 77 between the valve 78 and the header and provided with a hand valve 80. The valve 80 is, of course, closed at times when fluid under pressure is being delivered to the rams. So, also, the valve 78 is closed at times when the rams are being drained. The rams are shown as being coupled up in groups of two adjacent rows each, such rows extending from front to rear of the press. Above each of such rows of rams or, rather, above each of the corresponding rows of pipes 75, is a branch pipe 81 connected to the header. Each of the pipes 75 is connected to the overlying pipe 81. Furthermore, in each of the pipes 75, near the top, is a three-way valve 82. This valve serves to connect the main body of the pipe 75 to the supply pipe 81 or to shut off communication between these two pipes and connect the pipe 75 to a drain; this drain being provided to prevent the energization of any ram which has been shut off from the source of supply of compressed fluid, provided the shut-off valve should leak. Between the two rows of pipes 75 of each unit consisting of two rows is a drain pipe 83 which is connected by branch pipes 84 to all of the three-way valves in that unit. All of the drain pipes 83 are connected to a header 85 by means of pipes 86. Before admitting fluid under pressure to the rams, the three-way valves throughout the system are properly set to cut in or out any or all of the rams.

There will nearly always be some leakage of liquid past the packing on the plungers in the rams, but it is not desirable that this leakage shall overflow upon the contents of the press. Therefore, we have placed a hole 87 in the cylindrical wall of each hollow plunger, at a point between the two flanges thereon, and have placed another hole 88 in this same wall above the flange 62. In each of these latter openings we have placed an outwardly-seated check valve 89, so that fluids can flow into the interior of the hollow plunger but cannot escape in the opposite direction. Therefore, any leakage that there may be past the packings will find its way into the interior of the hollow plungers from whence the liquid may be withdrawn as will now be explained. It will be seen that the pipe 74 in each of the rams is, in effect, a continuation of the pipe 67. The pipes 67 in each row, from front to rear of the press, are connected to a pipe 90 which parallels the pipes 81 and 83. The pipes 90 are in turn connected to the header 85. Consequently, if the header 85 is connected to a suitable suction means, not shown, the water in the interior of all of the ram plungers may be withdrawn through the corresponding pipes 74 that extend down into the vicinity of the bottoms of the plungers, air entering through the check valves that replace the water which is withdrawn.

In this second form of press, as in the other, the pressure rams are loosely supported, whereby when they are energized and meet resistance, they are bodily lifted a short distance until stopped by the overlying cross member of the concrete frame of the press. Consequently, the press frame will not be stressed otherwise than by reason of the direct thrusts of the rams against one pressure-receiving surface and of the work against the other pressure-receiving surface. This second form, as in the case of the first, may be built or constructed at a low cost, possesses great ruggedness, and provides enormous capacity for a minimum of occupied space.

In both forms of the press illustrated, the loop-like reenforcing bars are shown as being endless and as having semi-circular top and bottom sections, although the form appearing in Fig. 9 comes nearer to that ideal type in which the top and bottom sections of the bars, whether endless or simply continuous, should be semi-circular, than does the other. In any event, it is simply a matter of engineering properly to curve or arch the upper and lower sections of the loop-like bars wherever the semi-circular form is not the most efficient.

While we have illustrated and described with particularity only a single preferred form of our invention, with a single modification, we do not desire to be limited to the exact structural details thus illustrated and described; but intend to cover all forms and arrangements which come within the definitions of our invention constituting the appended claims. We also wish to have it understood that, when we refer to endless or continuous bars, we do not mean that the sections of which such bars may be made are integral with each other or even in contact with each other, as long as the tension stresses in the structure are borne by the bars and not by the concrete in which they are embedded.

We claim:

1. A press frame comprising a mass of concrete having a large work-receiving opening bounded by parallel upper and lower pressure-receiving faces, endless reenforcing means for the concrete surrounding the said opening and each having upper and lower sections in the form of semicircles whose centers are respectively in about the planes of said upper and lower pressure-receiving faces, and a large number of rams arranged close together with their corresponding ends adjacent to one of said faces, said rams being distributed across the length and breadth of the latter face and being adapted to apply pressure distributed over a large area on work lying between the rams and the second of said pressure-receiving faces.

2. A press frame comprising a mass of concrete having a large work-receiving opening bounded by parallel upper and lower pressure-receiving faces, endless reenforcing means for the concrete surrounding the said opening and each having upper and lower sections in the form of semicircles whose centers are respectively in about the planes of said upper and lower pressure-receiving faces, a large number of rams arranged close together with their corresponding ends adjacent to one of said faces, said rams being distributed across the length and breadth of the latter face and being adapted to apply pressure distributed over a large area on work lying between the rams and the second of said pressure-receiving faces, a carriage supporting said rams, and means supporting said carriage for movements into and out of said opening.

3. In a press, a frame having a large work-receiving opening bounded at the top and bottom by parallel pressure-receiving faces, a heavy platen arranged within said opening between and parallel with said faces, and means to apply forces between the platen and one of said faces at a large number of points distributed across the length and breadth of the platen and the latter face to force the platen toward the other pressure-receiving face.

4. In a press, a frame having a large work-receiving opening bounded at the top and bottom by parallel pressure-receiving faces, a heavy platen arranged within said opening between and parallel with said faces, means to apply forces between the platen and one of said faces at a large number of points distributed across the length and breadth of the platen and the latter face to force the platen toward the other pressure-receiving face, and means for moving the platen away from the last-mentioned face.

5. A press comprising a monolith of concrete having a large work-receiving opening bounded at the top and bottom by pressure-receiving faces, reenforcing means for the concrete including endless reenforcing bars embedded therein and surrounding said opening, those portions of said bars above the upper pressure-receiving surface and below the lower pressure-receiving surface being in the form of semi-circles having their centers at said surfaces, a platen in the form of a block of reenforced concrete lying within and extending across said opening parallel with said pressure-receiving faces, means to raise the platen to permit work to be placed in said opening beneath the same, and numerous rams arranged between the top of the platen and the upper pressure-receiving surface, the rams being distributed across the length and breadth of the platen.

6. In a press, a monolith of concrete having a work-receiving opening bounded at the top and at the bottom by parallel pressure-receiving faces, numerous rams underlying the upper pressure-receiving face and adapted to abut against the same in order to press the work against the other pressure-receiving face, and reenforcing means for the concrete including numerous endless bars surrounding said opening and including vertical sections at opposite sides and sections in the form of semi-circles above and below said opening.

7. A press including a frame comprising a monolith of concrete having a work-receiving opening bounded on two sides by opposed pressure-receiving faces, endless reenforcing bars embedded in the monolith and surrounding said opening, the bars being disposed so as to act only as tension members, many rams within said opening near one pressure-receiving face and distributed across the length and width of said face, one member of each ram being held in the vicinity of the latter face, and a spring in each ram tending constantly to move the plunger thereof back into the cylinder.

8. A press including an upright frame comprising a monolith of concrete having a work-receiving opening bounded on the upper and lower sides by cross members of the frame having opposed pressure-receiving faces, endless reenforcing bars embedded in the monolith and surrounding said opening, the bars being disposed so as to act only as tension members, many tubular reenforcing elements extending vertically through the upper cross member of the frame and providing numerous vertical passages through the same, a ram below each of said tubular reenforcing elements, a pipe connected to each ram and extending loosely up through the corresponding tubular reenforcing element, and a shoulder on each pipe above the press frame to support the pipe and permit it to act as a hanger for its ram.

9. A press including a frame comprising a monolith of concrete having a work-receiving opening bounded on two sides by opposed pressure-receiving faces, endless reenforcing bars embedded in the monolith and surrounding said opening, the bars being disposed so as to act only as tension members, numerous rams hung from the upper cross member of the frame just below and distributed across the length and breadth of the upper pressure-receiving face, and means to energize said rams selectively.

10. A press including a frame having a large work-receiving opening bounded at the top and bottom by flat parallel pressure-receiving faces, numerous closely-spaced vertical rams just below the upper pressure-receiving face, and means supporting said rams to permit them limited bodily movements to and from positions in contact with the upper pressure-receiving face.

11. A press including a frame having a large work-receiving opening bounded at the top and bottom by flat parallel pressure-receiving faces, numerous closely-spaced vertical rams just below the upper pressure-receiving face, means supporting said rams to permit them to abut against the overlying pressure-receiving face in exerting pressure on work supported on the lower pressure-receiving face, and means to energize simultaneously all or any number of said rams.

12. In a press, a stationary upright frame having a large work-receiving opening bounded at the top and bottom by parallel pressure-receiving faces, a platen arranged within said opening between and parallel with said faces, numerous rams distributed across the length and breadth of said platen disposed between the top of the latter and the upper pressure-receiving surface, and means to raise the platen to permit work to be placed in the opening beneath the same.

13. In a press, a stationary upright frame having a large work-receiving opening bounded at the top and bottom by parallel pressure-receiving faces, a platen in the form of a block of reenforced concrete lying within and extending across said opening parallel with said pressure-receiving faces, and numerous rams arranged between the top of the platen and the upper pressure-receiving surface, and distributed across the length and breadth of the platen.

14. In a press, a stationary upright frame having a large work-receiving opening bounded at the top and bottom by parallel pressure-receiving faces, a platen in the form of a block of reenforced concrete lying within and extending across said opening parallel with said pressure-receiving faces, rams for raising the platen to permit work to be placed in said opening beneath the same, and numerous rams distributed across the length and breadth of the platen disposed between the top of the platen and the upper pressure-receiving surface.

In testimony whereof, we sign this specification.

GEORGE R. MEYERCORD.
OLIN H. BASQUIN.
CHARLES B. NORRIS.